US007552387B2

(12) United States Patent
Shen et al.

(10) Patent No.: US 7,552,387 B2
(45) Date of Patent: Jun. 23, 2009

(54) METHODS AND SYSTEMS FOR VIDEO CONTENT BROWSING

(75) Inventors: Bo Shen, Fremont, CA (US); Mehrban Jam, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1145 days.

(21) Appl. No.: 10/427,263

(22) Filed: Apr. 30, 2003

(65) Prior Publication Data

US 2004/0221322 A1 Nov. 4, 2004

(51) Int. Cl.
*G06F 3/00* (2006.01)
(52) U.S. Cl. ...................................... 715/716
(58) Field of Classification Search ............... 715/721, 715/716
See application file for complete search history.

(56) References Cited

U.S. PATENT DOCUMENTS

| 5,353,391 A | 10/1994 | Cohen et al. | |
| 2002/0069218 A1* | 6/2002 | Sull et al. | 707/501.1 |
| 2003/0033147 A1* | 2/2003 | McCartney et al. | 705/260 |
| 2003/0137522 A1* | 7/2003 | Kaasila et al. | 345/619 |
| 2003/0195882 A1* | 10/2003 | Lee et al. | 707/5 |
| 2004/0015490 A1* | 1/2004 | Snyder et al. | 707/3 |
| 2004/0125124 A1* | 7/2004 | Kim et al. | 345/716 |

FOREIGN PATENT DOCUMENTS

| EP | 0915471 | 5/1999 |
| EP | 1109111 | 6/2001 |
| EP | 1132835 | 9/2001 |
| WO | WO98/52356 | 11/1998 |
| WO | WO01/41451 | 6/2001 |

OTHER PUBLICATIONS

Aiken et al., Microsoft Computer Dictionary, Fifth Edition, Microsoft Press (2002, p. 336).*
Zhong, Di et al—"Clustering Methods for Video Browsing and Annotation"—Proceedings of SPIE vol. 2670—Feb. 1, 1996—pp. 239-246.

* cited by examiner

*Primary Examiner*—Stephen Hong
*Assistant Examiner*—Le Nguyen

(57) ABSTRACT

Methods and systems for browsing video content are described. Video content is accessed. Metadata from a content analysis that is performed on said video content is generated. A portion of said video content based on said generated metadata is presented for display.

29 Claims, 14 Drawing Sheets

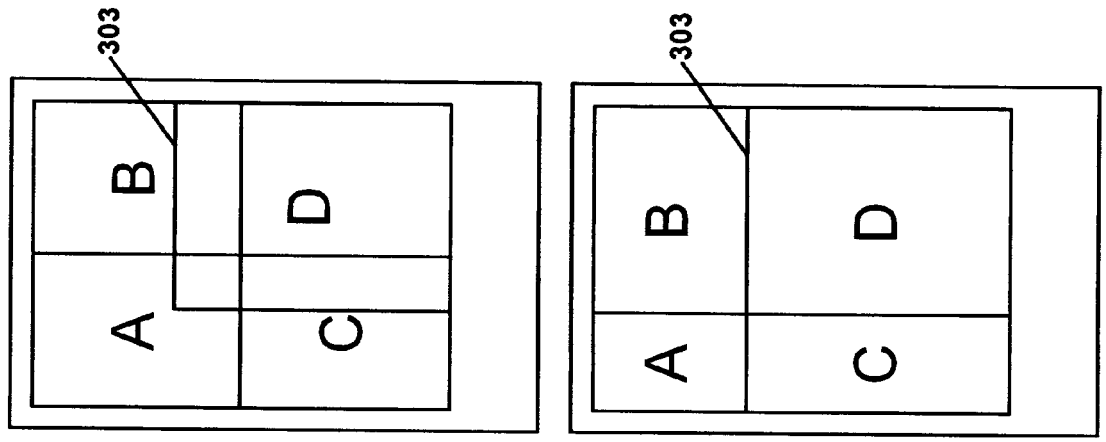
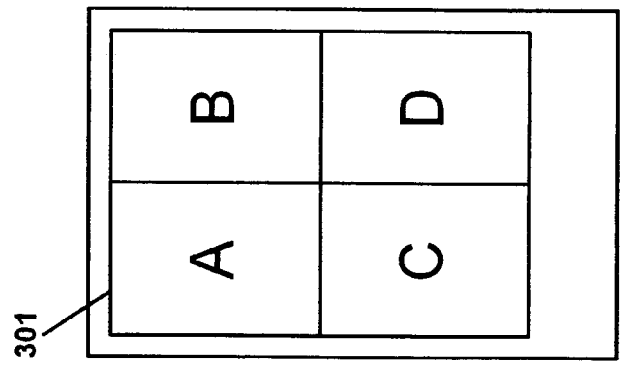
FIG. 3A

600

```
<video_structure>
  <kf_cluster level="1">
    <img src="kf-0000132.jpg" begin="132" end="227"/>
    <img src="kf-0000228.jpg" begin="228" end="336"/>
    <img src="kf-0000386.jpg" begin="386" end="458"/>
      <kf_cluster level="2">
        <img src="kf-0000717.jpg" begin="717" end="764"/>
        <img src="kf-0000762.jpg" begin="762" end="764"/>
      </xf_cluster>
    <img src="kf-0000459.jpg" begin="459" end="576"/>
    <img src="kf-0000577.jpg" begin="577" end="684"/>
    <img src="kf-0000685.jpg" begin="685" end="764"/>
    <img src="kf-0000765.jpg" begin="765" end="800"/>
    <img src="kf-0000801.jpg" begin="801" end="852"/>
    <img src="kf-0000885.jpg" begin="853" end="894"/>
    <img src="kf-0000912.jpg" begin="895" end="950"/>
    <img src="kf-0000951.jpg" begin="951" end="992"/>
    <img src="kf-0000993.jpg" begin="993" end="1008"/>
  </xf_cluster>
<video_structure/>
```

```
<video_structure>
  <kf_cluster>
    <img src="kf.jpg" text_cue="introduction" begin="132" end="227"/>
    <img src="kf.jpg" text_cue="development" begin="228" end="336"/>
    <img src="kf.jpg" text_cue="revenue report" begin="386" end="458"/>
    <img src="kf.jpg" text_cue="conclusion" begin="459" end="576"/>
  </kf_cluster>
<video_structure/>
```

FIG. 7

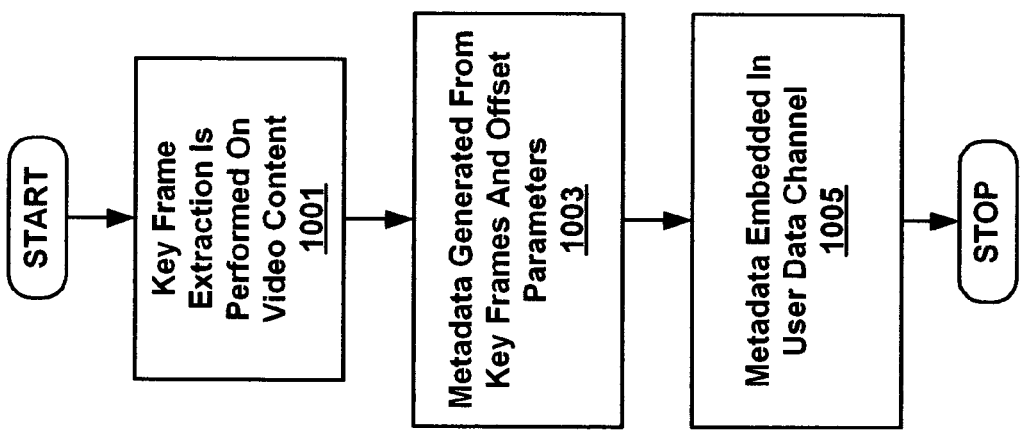

METHODS AND SYSTEMS FOR VIDEO CONTENT BROWSING

TECHNICAL FIELD

The present invention relates generally to the presentation of video content. In particular, embodiments of the present invention relate to methods and systems for browsing displayed video content.

BACKGROUND ART

The capacity to adequately accommodate the wide variety of video content that is currently available is a basic requirement of today's computer system displays. However, the space limitations of a display can affect its capacity to fully present video information. Displays that feature an abundance of display space are able to easily accommodate video content. Systems that possess the capacity to accommodate such content are better able to meet the demands of the modern consumer. However, many consumers favor smaller devices that feature limited display space. These devices provide other benefits that are of interest to consumers such as a smaller size that enables owners to carry these devices on their person as they move from place to place.

The space limitations of the displays used with some devices inhibit a user's ability to browse dynamic video content that is presented thereon. These limitations prevent consumers using mobile computer systems from fully taking advantage of the information provided by available video products. Presently there is not a good solution for presenting dynamic video content on devices such as mobile devices.

SUMMARY OF THE INVENTION

Methods and systems for browsing video content are described. In one embodiment, video content is accessed. Metadata from a content analysis that is performed on said video content is generated. A portion of said video content based on said generated metadata is presented for display.

BRIEF DESCRIPTION OF THE DRAWINGS

The accompanying drawings, which are incorporated in and form a part of this specification, illustrate embodiments of the invention and, together with the description, serve to explain the principles of the invention.

FIGS. 3A and 3B show block diagrams that illustrate the "video only" mode according to one embodiment of the present invention.

FIG. 6 shows an example of extensible markup language (XML) metadata according to one embodiment of the present invention.

FIG. 7 shows an example of XML metadata including embedded text data according to one embodiment of the present invention.

FIG. 10 is a flowchart of a process of creating and embedding metadata in a video content stream according to one embodiment of the present invention.

DETAILED DESCRIPTION OF THE INVENTION

Reference will now be made in detail to embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well known methods, procedures, components, and circuits have not been described in detail as not to unnecessarily obscure aspects of the present invention.

Figure 1A:
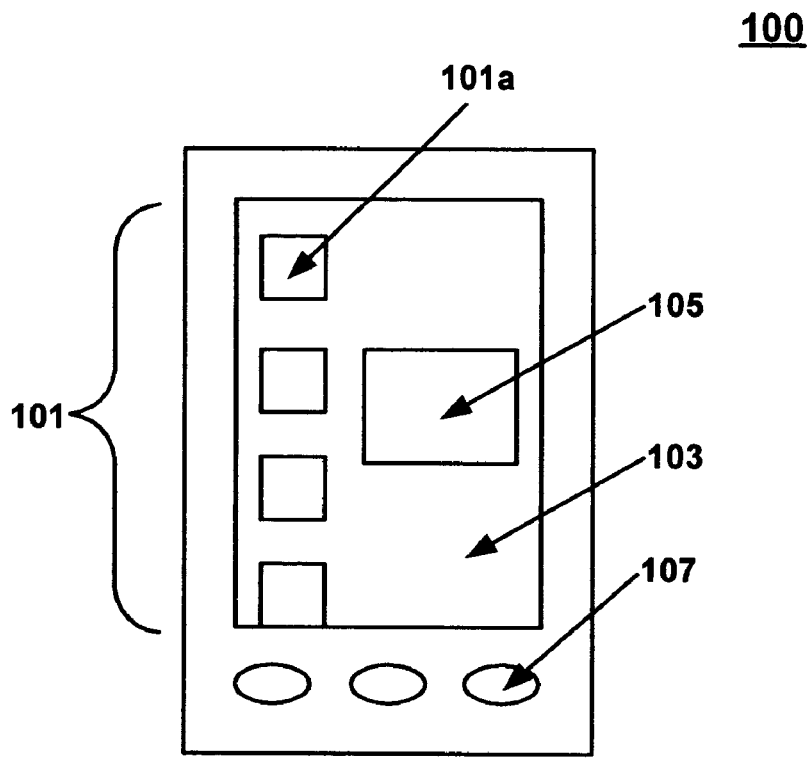
FIG. 1A shows a video browsing system according to one embodiment of the present invention.

Exemplary Video Browsing System in Accordance with Embodiments of the Present Invention FIG. 1A shows a video browsing device 100 according to one embodiment of the present invention. It should be appreciated that the video browsing device 100 (e.g., personal digital assistant (PDA), computer/monitor, notebook) possesses a video data processing functionality which allows system users to browse video content. According to one embodiment, the video content may be supplied from an internal source (e.g., memory, storage component, etc.) that is locally resident in the video browsing device 100. According to another embodiment, an external source (e.g., a server, etc.) is employed to supply the video content.

Content analysis is performed to divide the video content into a number of sequences. Out of each sequence a "key-frame" is selected and optionally displayed. Each key-frame is representative of a respective sequence. The key-frames can be automatically selected or alternatively, they can be manually selected. In one embodiment a user selects a keyframe, and in response the associated video sequence is played back (displayed).

It should be appreciated that, video content analysis is a technique that derives semantic meanings of video sequences by looking into statistical features of video frames. According to one embodiment, typical semantic context include video shot boundaries (determining where a shot starts and terminates, e.g., scene change), key-frames (finding out representative frames in one segment of a video), camera motion classifications (finding out whether there is a camera motion, e.g., panning, zooming, rotation in one segment of video) and some simple video type classifications (e.g., whether it's a sports video with lots of actions or talking-head with less action in the scenes).

According to one embodiment, image processing as well as computer vision techniques are employed to first extract low-level statistical features such as color distribution, edge distribution, and the optical flow of pixels in video frames. Subsequently, feature classification techniques are used to numerically derive higher-level semantic information. For example, if there is a sudden change in color or edge distribution between two consecutive frames, a shot boundary is identified. It should be appreciated that, between two shot boundaries, there is relatively less change in the low-level feature distributions. Consequently, a frame in between two shot boundaries can be chosen as the representative frame of the underlying sequence of frames existing between the two shot boundaries. This representative frame may be called a key-frame.

It should be appreciated that information generated from a content analysis (e.g., offset parameters, key-frames, etc.) may be organized (such as by a metadata generator—not shown) and put into an XML metadata format that facilitates the browsing of video content. For example, according to one embodiment, information such as extracted key-frames, offset parameters of shots represented by the key-frames, and video content data that is generated or identified from content analysis, can be organized into an XML metadata format that is either embedded or mapped to video content. In the former case, the metadata is embedded with the video content itself (e.g., in the video file); this is discussed further with regard to FIG. 8, below. In the latter case, the metadata is stored separately from the video content and mapped to the associated video content. For example, the metadata is saved in a file and the video content in another file, with the contents of the metadata file mapped to the contents of the video file.

The video frames that are displayed provide a summary representation of underlying video content (e.g., summarizes the video content) and can after their display be chosen for playback of a represented video sequence. FIG. 1A shows key-frame windows 101, key-frames 101a, system display 103, video playback window 105 and control buttons 107.

Figure 1B:
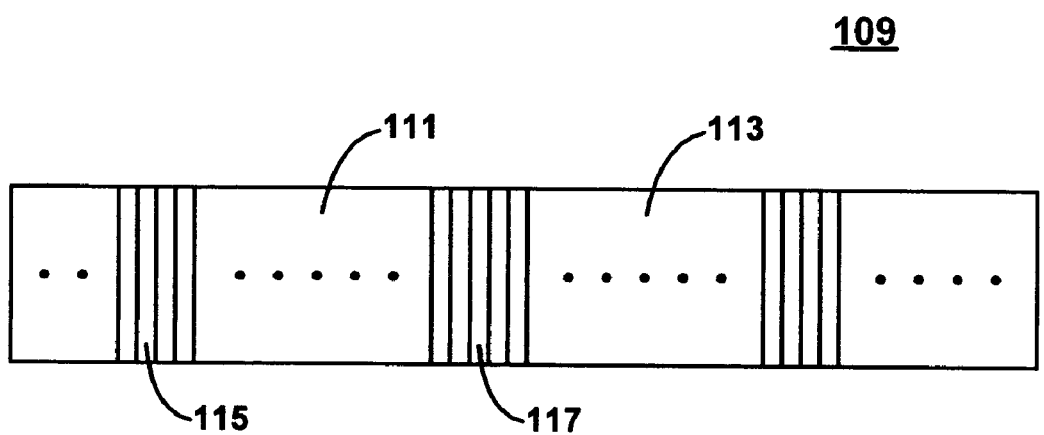
FIG. 1B is a schematic that shows the relationship between a video content portion and associated key-frames according to one embodiment of the present invention.

Key frame windows 101 present key-frames 101a that may be identified based on either the video content analysis or manual selection methodologies noted above. As discussed above, each of these frames represent an associated video content portion. FIG. 1B is schematic that shows the relationship between a video content portion and associated key-frames according to one embodiment of the present invention. FIG. 1B shows video content 109, first sequence of video frames 111, second sequence of video frames 113, key-frame representing first sequence 115, and key-frame representing second sequence of frames 117.

According to one embodiment, a video content portion 109 can contain several sequences of video frames (e.g., such as 113 and 115 shown in FIG. 1B). These sequences of video frames (e.g., 113 and 115) can be represented by key frames 101e (e.g., 115 and 117) that are selected from a video content portion (e.g., 109) for display to a user (such as by processes discussed herein). These key-frames 101e provide a user with a video frame summary of associated video content portions (e.g., 109).

Any of the displayed key-frames 101a can be selected (e.g., such as by physically contacting the desired key frame with a stylus or by any other manner that facilitates a selection of a desired key-frame) in order to begin the execution of a static or moving frame presentation of the underlying video sequence (e.g., "shot") that it represents. After the selection of the desired key-frame the underlying video sequence of video frames from the video content that is represented by the selected-key frame is presented (e.g., played back) in the system display area 103.

Video playback window 105 is a display that presents selected video content. As previously mentioned the video content that is displayed can be presented in either a static or moving frame manner. It should be appreciated that the video content that is shown may correspond to a key-frame 101a selected from one or more key-frames presented in system display 103. According to one embodiment key-frame windows 101 and video playback window 105 may be either together or separately presented on the display 103 of the video browsing system 100 in a plurality of configurations or modes that are designed to make the best use of the limited display real estate that is available (see discussions provided herein).

System display 103 presents the key-frame and video playback windows (e.g., 101 and 105). These windows may be organized in a variety of configurations or modes. These configurations include but are not limited to key-frames only, video only, and video and key frames modes. These modes are discussed in detail below with reference to FIGS. 2A-2E, 3A, 3B, 4A, and 4B.

Control buttons 107 control selected functions of the video browsing system 100. These functions may or may not include some or all of the functions of the video browsing system 100 discussed herein.

FIGS. 2A, 2B, 2C, 2D and 2E show block diagrams that illustrate the key frame only mode according to one embodiment of the present invention. In the key-frames only mode, only key-frames 201a-201d are presented in system display 103. It should be appreciated that each key-frame represents a collection of video frames or "shots" (e.g., video frame sequence). A key-frame that interests a system user can be selected from the displayed key-frames and the underlying video frame sequence that encompasses the collection of video frames (e.g., shot) represented by the selected key-frame presented in the system display 103.

It should be appreciated that, during a key-frames only presentation, the system display 103 area is almost entirely devoted to the key-frames 101a that are selected. According to one embodiment, there area plurality of sub-modes of the key-frames only mode. The sub-modes may include but are not limited to spatial zoom in and zoom out, context zoom in and zoom out, and automatic sliding. These methods are discussed in detail below.

Figure 2A:
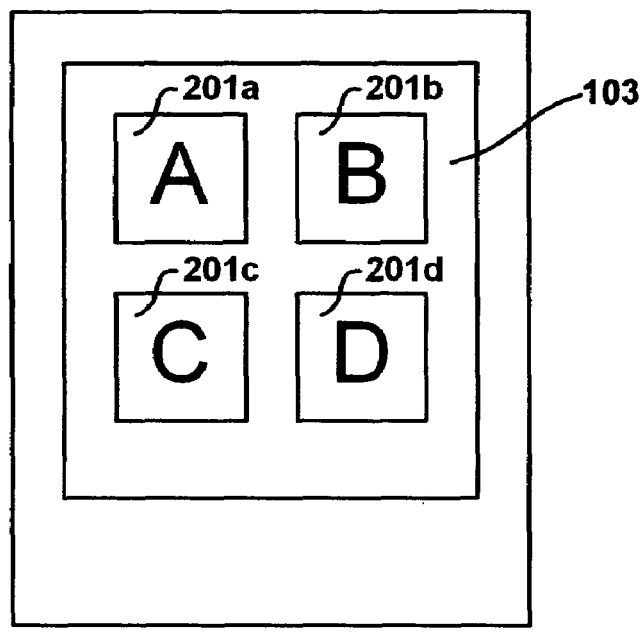
FIG. 2A shows a block diagram of a spatial zoom perspective view of key frames presented in the system display according to one embodiment of the present invention.

FIG. 2A shows a block diagram 200 of a spatial zoom perspective view of key-frames presented in the system display 103 according to one embodiment of the present invention. FIG. 2A shows system display 103 and key-frames 201a-201d. According to the spatial zoom perspective shown in FIG. 2A, all of the key-frames selected for presentation can fit into the system display 103 area. At other spatial zoom perspectives the collection of key-frames 201a-201d may exceed the boundaries of the system display 103 window. It should be appreciated that users can change the scale of the displayed images so that the images presented in the display is reduced or enlarged.

Figure 2B:
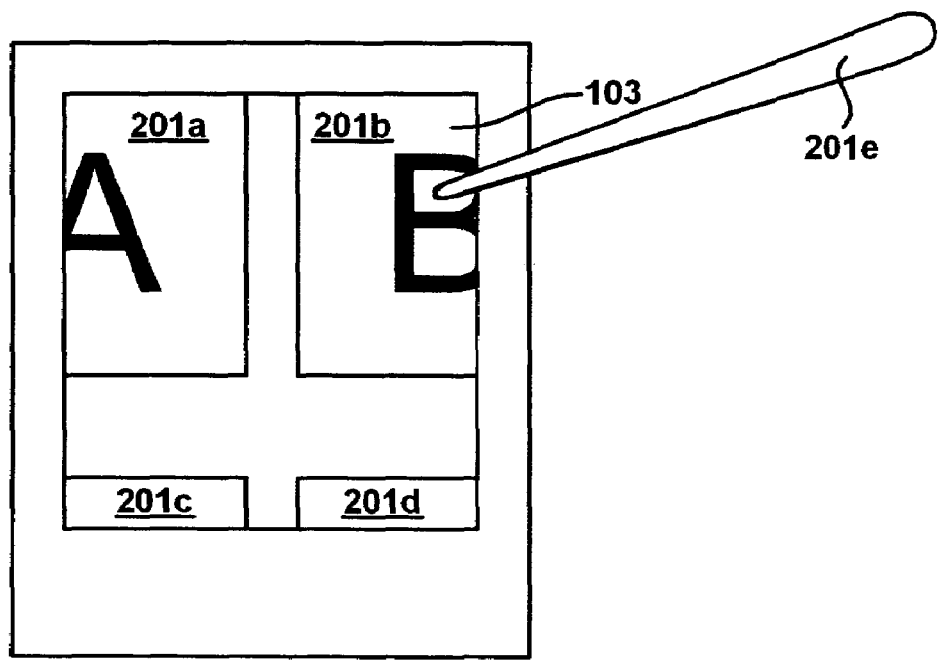
FIG. 2B shows a block diagram of an enlarged spatial zoom perspective view of the key frame presentation shown in FIG. 2A, according to one embodiment of the present invention.

FIG. 2B shows a block diagram 210 of an enlarged spatial zoom perspective view of the key-frame presentation shown in FIG. 2A. FIG. 2A illustrates the situation where an enlarged perspective view of the collection of key-frames (e.g., 201*a*-201*d*) shown in FIG. 2A exceeds the boundaries of the system display 103 window. According to one embodiment, in such a situation a stylus driven scroller 201*e* is used to browse a collection of key-frames (e.g., 201*a*-201*d*), by positioning a desired key-frame(s) 201*a*-201*d* so that it can be viewed in the system display 103 window (see FIG. 2C below). According to other embodiments, other means can be employed to browse the collection of enlarged key-frames (e.g., 201*a*-201*d*).

Figure 2C:
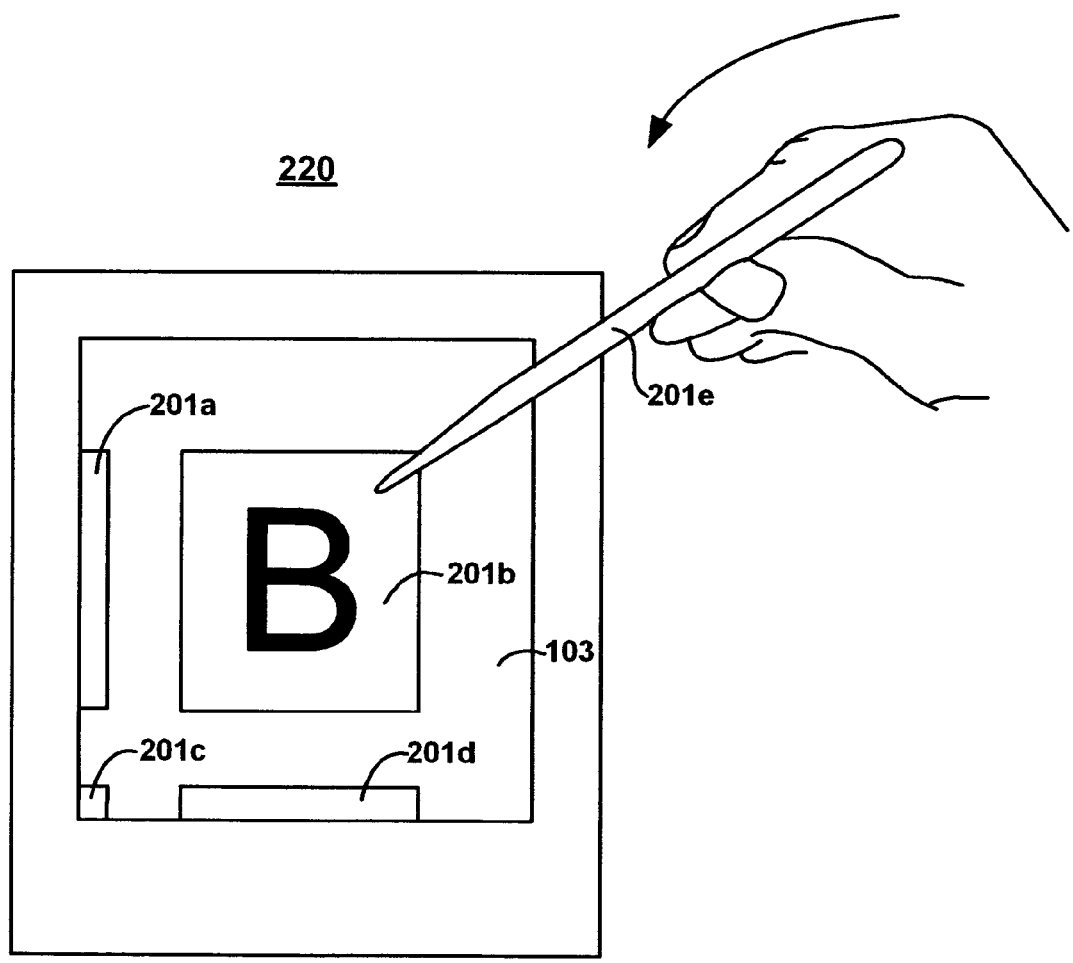
FIG. 2C shows a block diagram of the spatial zoom perspective view shown in FIG. 2B repositioned so that a desired key frame may be wholly presented in the system display window, according to one embodiment of the present invention.

FIG. 2C shows a block diagram 220 of the spatial zoom perspective view shown in FIG. 2B having a key-frame repositioned (e.g., such as by using stylus 201*e* to scroll the images shown in the display) so that a desired key-frame may be wholly presented in the system display 103 window. In this manner, (e.g., by scrolling) any of the key-frames (e.g., 201*a*-201*d*) in a collection can be easily viewed.

Figure 2D:
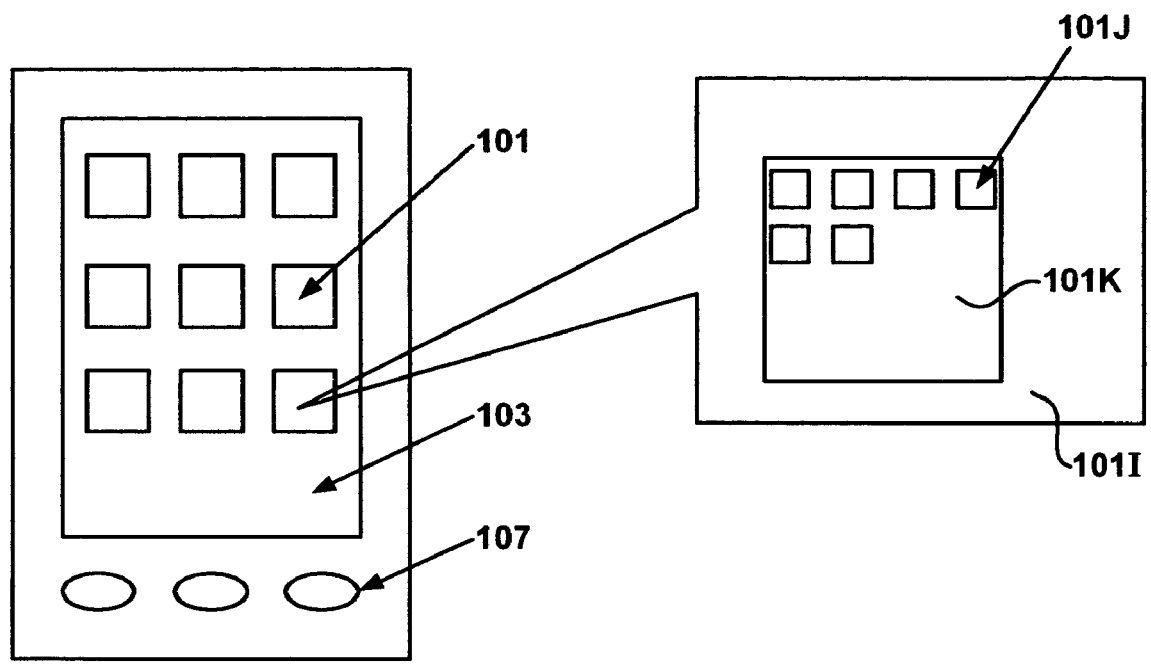
FIG. 2D shows a block diagram of video browsing system that illustrates the context zoom in/out mode/function according to one embodiment of the present invention.

FIG. 2D shows a block diagram 230 of video browsing system 100 (e.g., also shown in FIG. 1) that illustrates the context zoom in/out mode/function according to one embodiment of the present invention. The context zoom in/out mode/function allows a collection of video frames 101J encompassing a video sequence (e.g., a shot) that is represented by a key-frame (e.g., 101*a*) to be selected for presentation in the system display 103 window. Upon selection, a key-frame (e.g., 101*a*) expands to reveal the individual video frames 101J from the video frame sequence that is represented thereby. In addition to the structures enumerated in the discussion of FIG. 1 above, FIG. 2D shows key-frame blow up 101I, sub-level key-frames 101J, and sub-level key-frame view 101K.

Key-frame blow-up 101I shows a sub-level or "expanded" key-frame view (e.g., context zoom in) 101K of sub-level key-frames 101J. According to one embodiment, from a key-frame hierarchy stored in metadata that may be derived from content analysis, the sub-level or expanded key frames 101K that are selected can be determined. A browser can perform context zoom in at a selected spatial resolution for each of the key-frames 101*a* shown in FIG. 2D to produce such sub-level key-frame views. It should be appreciated that a given spatial resolution may involve several sub-levels (e.g., levels within levels). According to one embodiment, the key-frames at each sub-level provide a finer grain detail of the video content that they represent than the key-frames located at a level that preceded it. This is because a video frame sequence that is represented by sub-level key-frames corresponds to a more narrow tract of video content than does a video frame sequence represented by key-frames at higher levels. According that to one embodiment, in the context zoom in mode, a system user may view greater detail of a sub-level collection of expanded key frames 101K by accessing finer grain sub-levels. If the user is interested in particular ones of a sub-level collection of expanded key-frames 101K, a spatial zoom in (see the discussion of spatial zoom in above) may then be performed.

Figure 2E:
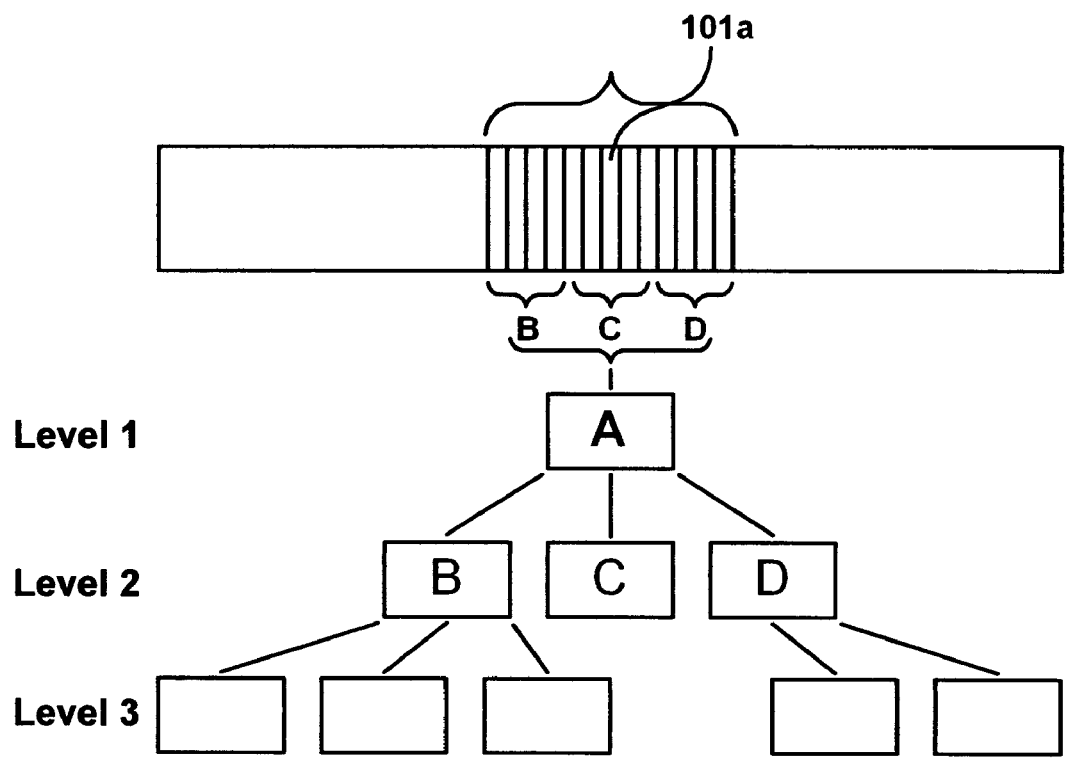
FIG. 2E shows a block diagram illustrating a sub level key frame structure according to one embodiment of the present invention.

FIG. 2E shows a block diagram 240 illustrating a sub-level key-frame structure according to one embodiment of the present invention. FIG. 2E shows video content portion 101*a*, and selected key-frames A, B, C, and D. Moreover, FIG. 2E shows first, second and third sub-levels. It should be appreciated that each sub-level provides a finer grain detail of the underlying video content that it represents than the level that preceded it, e.g., for example if video content portion 101*a* (represented by key-frame A) contains 30 minutes of video, and key-frames B, C, and D each represent a 10 minute fraction of video content portion 101*a*, a user can either select key-frame A which represents the entire 30 minute tract of video content contained in video content portion 101*a*, or can narrow within A by selecting key-frames B, C or D, which each represent a more narrow, fine grain tract of video content than does key-frame A.

According to one embodiment of the present invention, an automatic key-frame slide show is presented. In the automatic key-frame slide show mode, key-frames (e.g., 101*a*) are automatically displayed in a slide show type presentation at a selected spatial/context resolution. It should be appreciated that a user can increase or decrease the speed of the automatic slide show presentation as they choose. In addition, when a key-frame of interest to the system user is encountered, that key-frame (e.g., 101*a*) can be selected and the collection of video frames (e.g., shot) represented by the key-frame (e.g., 101*a*) may be presented in the video playback window as a moving video sequence.

Figure 3B:
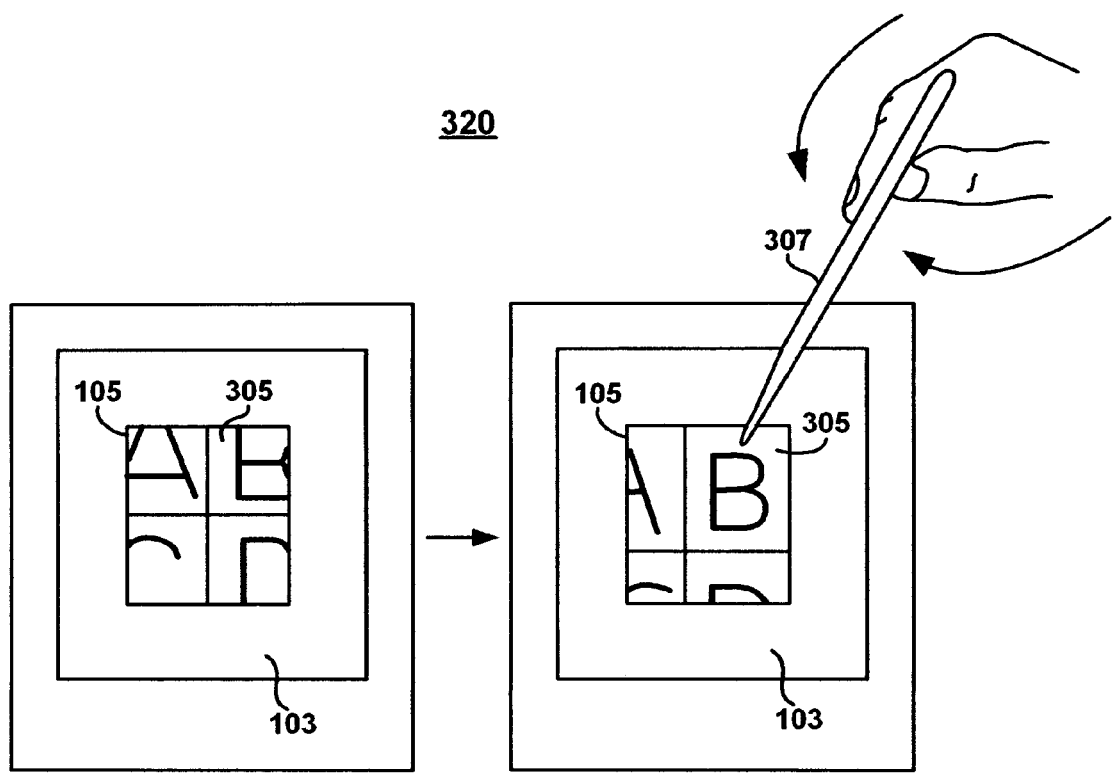

FIGS. 3A and 3B show block diagrams that illustrate the "video only" mode according to one embodiment of the present invention. In the "video only" mode the entire display area (e.g., 103) is devoted to video playback functions. According to one embodiment, there are a plurality of sub modes of the "video only" mode that may be supported by exemplary systems. These sub modes may include cropped video portion magnification and partial view of full resolution video display.

FIG. 3A is a block diagram 300 which illustrates the cropped portion magnification mode according to one embodiment of the present invention. FIG. 3A shows fixed sized window 301 and magnifier 303. When in the cropped video portion magnification mode, video content may be played in a fixed sized window (e.g., 301). In addition, a portion of the video (see "D" in FIG. 3A) that is of interest to a user (which is displayed in the fixed sized window 301) may be played through a magnifier (e.g., 303). According to one embodiment of the present invention the portion of the video that is of interest to the user may be selected by the user to be played through the magnifier. According to one embodiment, this selection is made, for example, by using a stylus to demarcate a portion of the displayed video content that is of interest to the user. According to other embodiments this demarcation is made by any other manner capable of facilitating the indication of an area that a user desires to be isolated and magnified.

As is illustrated in FIG. 3A, in the "video only" mode the entire display (e.g., 103) is devoted to video playback functions. In an example scenario, if the user uses the stylus to demarcate area D to be magnified, the rest of the display areas A, B and C are either squeezed towards their relative positions as shown at the lower right hand side of FIG. 3A, or maintains their original size, but are overlapped (dashed lines indicate overlapped boundaries of A, B and C) by the enlarged portion of D as shown at the upper right hand side of FIG. 3A.

Some degree of distortion may be present at the boundaries of the fixed sized window 301. It should be appreciated that even though the portion of interest (e.g., the magnified portion played through magnifier 303) can be displayed in an enlarged area, other video portions may be visible (such as in fixed sized window 301) so that the subject matter recorded in those areas may be viewed as well. Moreover, a user may select any portion desired (e.g., such as A, B, C, or D in FIG.

3A) of the video displayed in the fixed sized window 301 for enlargement (e.g., to be played through the magnifier).

FIG. 3B shows a block diagram 320 which illustrates the partial view of full resolution video mode according to embodiments of the present invention. FIG. 3B shows area of user interest 305 and stylus 307. When in partial view of full resolution video display mode, an area of user interest 305 is presented in the playback window 105 of system display 103 in full resolution (or higher if desired). In other embodiments the entire system display 103 is used to present the full resolution video. However, due to the space limitations of the playback window 105 (or system display window 103) of system display window 103, a portion of the video may not be visible to the user (see FIG. 3B). According to one embodiment, a stylus 307 is employed to position the displayed video with respect to the system display 103 window. In other embodiments, in other manner of positioning the displayed video with respect to system display may be employed.

Figure 4A:
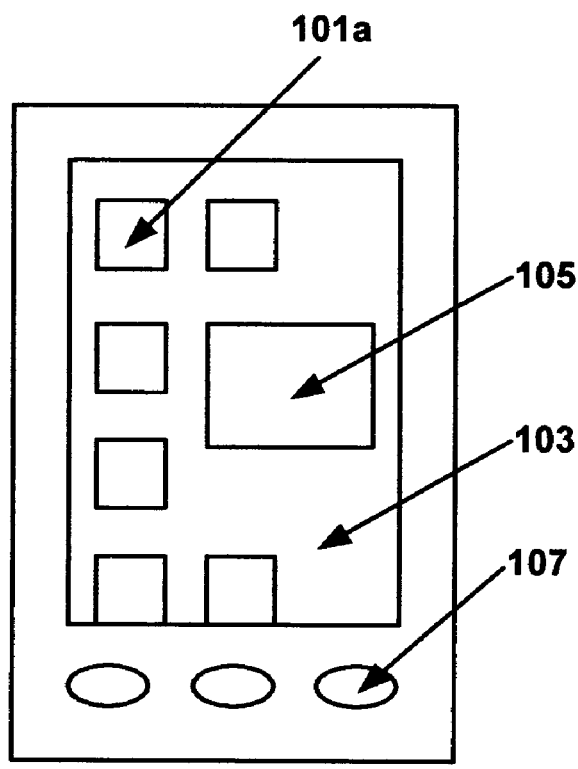
FIGS. 4A and 4B show block diagrams that illustrate the "video and 'key frames'" mode according to one embodiment of the present invention.
Figure 4B:
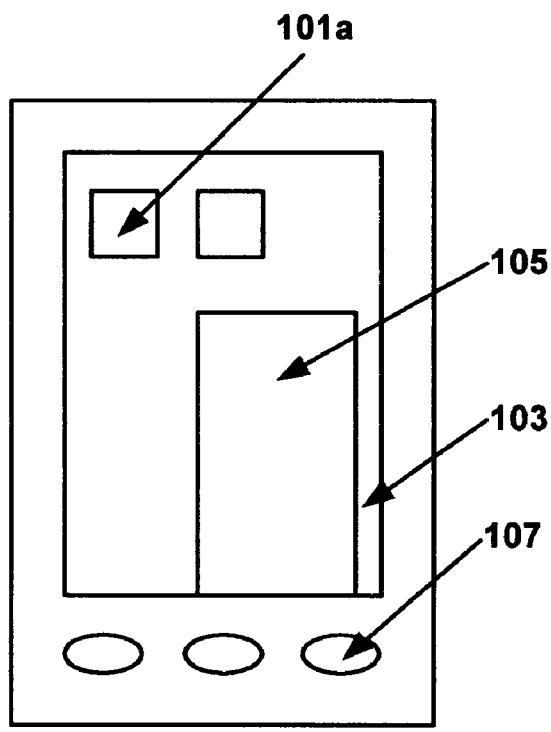

FIGS. 4A and 4B show block diagrams that illustrate the "video and key-frames" mode according to one embodiment of the present invention. In the "video and key-frames" mode both key-frames 101a and video are presented in the system display 103. This mode features a plurality of sub-modes that include but is not limited to key frame dominated and video dominated.

FIGS. 4A shows block diagram 400 that illustrates the key-frames dominated mode according to one embodiment of the present invention. In the key-frames dominated mode, the video occupies a smaller portion of the system display (e.g., 103) as compared to the portion occupied by the key-frames (e.g., 101a). According to one embodiment, the user continues to browse the underlying video program content using key-frames. An extreme application of this mode features a reduction of the video playback window (and displayed video) 105 until it is completely eliminated. In such cases, the audio track that accompanies the eliminated video may still be heard. This mode of operation is useful when the user is interested in reviewing the audio track of the eliminated video while browsing key-frames (e.g., 101a) for other video portions that are of interest.

FIGS. 4B shows block diagram 410 that illustrates the video dominated mode according to one embodiment of the present invention. In the video dominated mode, the key-frames (e.g., 101a) occupy a smaller portion of the system display 103 as compared to the video (shown in playback window 105). However, a user can still easily browse the underlying program content, because a portion of the display remains dedicated to the key-frames (e.g., 101a). These key-frames may be selected as described herein to browse the underlying video program content.

According to exemplary embodiments a user can seamlessly alternate between the featured browsing modes. For example, if the user is interested in one of the key-frames (e.g., 101a) displayed during "'key-frames only" browsing, the user selects the key-frame (e.g., 101a) that is of interest and switches to a video only presentation that is based on the selected key-frame (e.g., 101a). According to one embodiment, during a video only presentation the user can switch to the video and key-frames mode, where a moving sequence of video frames may be presented in the playback window 105 while individual key-frames (e.g., 101a) are simultaneously presented in the key-frame windows (e.g., 101).

Figure 5:
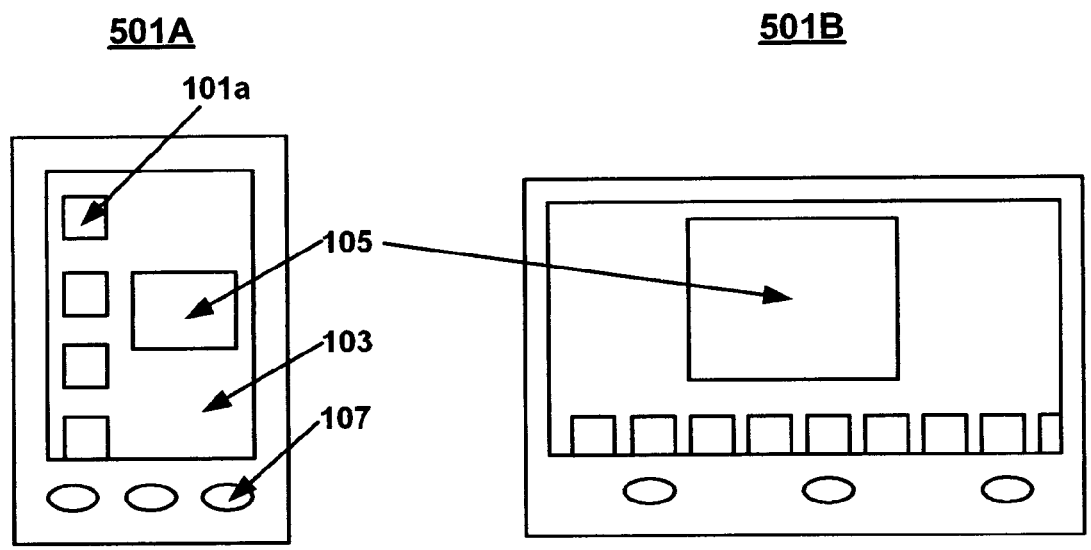
FIG. 5 is a block diagram that illustrates the automatic presentation orientation feature according to one embodiment of the present invention.

FIG. 5 is a block diagram that illustrates the automatic presentation orientation feature according to one embodiment of the present invention. FIG. 5 shows vertical 501A and horizontal 501B presentation orientations. It should be appreciated that according to one embodiment, the browsing system (e.g., 100) automatically selects its dominant presentation orientation. It should be appreciated that the aspect ratio of the display (e.g., 103) is a factor used in presentation orientation selection. For example, according to one embodiment, for devices (e.g., hand held, etc.) with a resolution of 640×320, the horizontal direction (e.g., 501B) may be chosen as the presentation orientation of the key-frames (e.g., 101a) and video playback window (e.g., 105). And, for devices with a resolution of 240×320 (such as with ipac devices, etc.) the vertical direction (e.g., 501A) may be selected as the presentation orientation of the key-frames (e.g., 101a) and video playback window (e.g., 105). According to one embodiment, automatic presentation orientation is implemented using an orientation sensor; in other embodiments, other technologies can be employed.

According to one embodiment, an exemplary browser is designed to be driven by a stylus (e.g., 201e, 307). For example, a stylus (e.g., 201e, 307) can be used to scroll key frames in a particular direction by simply holding the stylus (e.g., 201e, 307) over a desired key-frame window (e.g., 101) and moving the stylus (along with the selected key-frame) in the desired direction. According to one embodiment, the speed of playback of a video clip is controlled by touching (e.g., such as by tapping) the display screen with the stylus (e.g., 201e, 307) inside the key-frame window (e.g., 101) that corresponds to the video clip. Subsequently, the speed of playback of the video clip may be slowed by tapping the display screen with the stylus (e.g., 201e, 307) outside of the key-frame window (e.g., 101).

According to one embodiment, key-frame (e.g., 101a) based browsing is enabled by XML based meta-data generated for video frames (see discussion of FIGS. 8 and 9 below). It should be appreciated that where a server (not shown) is employed to supply the video content from remote memory, the XML based metadata may also be supplied by the server. In such cases, the streaming video may be read and displayed by the client browsing device. In other cases, where video content is accessed from local memory, metadata can be locally generated and stored to facilitate key frame extraction.

According to one embodiment, a metadata generator (not shown) can first perform a key-frame (e.g., 101) extraction using content based analysis methods. The extracted key-frames (e.g., 101) along with the offset parameters of the shots represented by the extracted key-frames (e.g., 101) are then organized into an XML data structure. Subsequently, corresponding XML metadata can be embedded into the underlying video stream e.g., such as by embedding the information in the user data field (the channel of a video signal that is used to carry user data) of a MPEG (moving pictures expert group) stream. Alternatively, the XML metadata may be embedded alone if the key-frames (e.g., 101) can be selected as the intra-frames in a video sequence. Subsequently, the key-frames (e.g., 101) can be extracted from the video program content using the offset information provided in the metadata when a browsing operation is executed. It should be appreciated that this approach may reduce the storage overhead of the video program content since it can effect a reduction in the amount of data necessary to be stored to support a key-frame extraction process.

FIG. 6 shows an example of XML metadata 600 according to one embodiment of the present invention. According to one embodiment, the filename of each key-frame is specified by an "src=" field. The start and end bytes of the video shot that the key frame represents may be specified by "begin=" and "end=" fields respectively. The "kf_cluster" field specifies the level of the key-frame. For example, in FIG. 4, the field level="2" indicates that that the third key-frame from level 1 can be additionally represented by two sub level key-frames. Consequently, when a context zoom in operation is executed on the aforementioned third key-frame at the main level, the two additional key-frames (e.g. 101*a*) that are also representative of the video shot may be displayed.

According to one embodiment of the present invention, if content analysis of the video content indicates that there is a long series of similar key-frames (e.g., 101*a*) in a video sequence (e.g., a video sequence that shows an individual standing in a single location giving a lecture before a static background), a single key frame (e.g., 101*a*) is repetitively utilized as being representative of this sequence at different points in time. According to one embodiment, these key-frames (e.g., 101*a*) are overlaid with text if the content analysis engine has a speech-to-text generating capability.

Such a technique may be employed, for example, in an extended video sequence that features a single figure (e.g., executive addressing a group, or a training video). In such cases, even though a single key-frame (e.g., 101*a*) may be extracted and repetitively utilized as representative of different content portions of the extended video sequence, it should be appreciated that the content of the video sequence remains distinguishable. This is because, according to exemplary embodiments, each of the repeated key-frames (e.g., 101*a*) may represent one or more of the various topics that are discussed by the figure featured in the video sequence. The content analysis engine may embed text information in the XML metadata for each of the respective key-frames after ascertaining the content of various portions of the extended video sequence from the audio/voice cue. It should be appreciated that even though identical key-frames (e.g., 101*a*) may be used for each of the various content portions of the extended video sequence, the text overlay utilized for each of the respective key-frames (e.g., 101*a*) may differ as corresponding to each specific content portion.

FIG. 7 shows an example of XML metadata 700 including embedded text data according to one embodiment of the present invention. Key-frames can be presented with overlaid text as specified in the "text_cue=" field located in the embedded metadata. According to one embodiment, the browser presents the text information with a link to the corresponding video segment. Upon the selection of the link, the video segment that corresponds to the link is played back. According to one embodiment, the user can turn off the video and listen to the audio playback.

Figure 8:
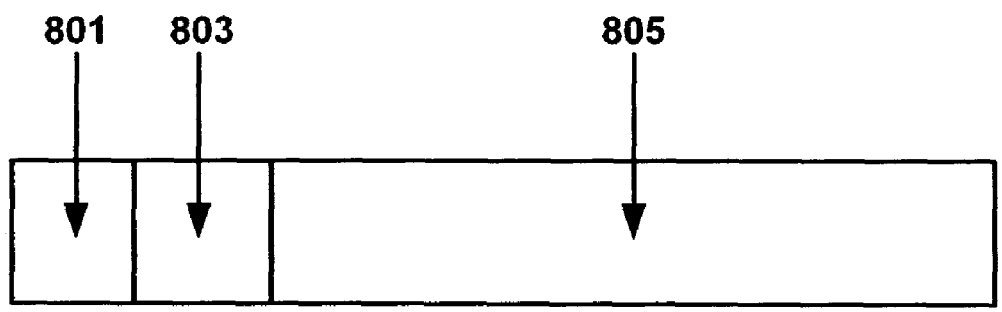
FIG. 8 is a data structure diagram that shows a video content structure according to one embodiment of the present invention.

FIG. 8 is a data structure diagram 800 that shows a metadata embedded video content structure according to one embodiment of the present invention. The video content structure includes XML metadata 801, key-frames 803, and video stream 805. As previously discussed, the XML metadata 801 allows the extraction of key-frames 803 (e.g., 101*a* in FIG. 1) from the video stream 805 and facilitates the browsing of video program content that is derived therefrom. Alternatively, key-frames may not be extracted but can be retrieved on the fly as noted above. Moreover, it should be appreciated that metadata can be stored separately from the video content and mapped to it. That is, for example, the metadata can be saved in a file and the video content in another file, with the contents of the metadata file mapped to the contents of the video file.

According to one embodiment XML metadata 801 may include information such as is shown in FIGS. 6 and 7. For example, metadata 801 may include information such as is illustrated in the FIG. 6 line, img src="kf-0000132.jpg" begin="132" end="227"/>. Moreover, metadata 801 may include information such as is provided in any of the other lines illustrated in FIGS. 6 and 7.

According to one embodiment, the video content structure shown in FIG. 8 may not include key frames 803 in some embodiments. In embodiments where the key frames are not included, the key frames may be retrieved on the fly, utilizing the metadata (e.g., offset information, etc.) that is either embedded or mapped to the associated video content. The key frames thus retrieved can thereafter be presented on the system display (e.g., 103) for browsing purposes to a system user. An advantage of this embodiment is that the size of the embedded data can be smaller since the key frame is not included.

Advantages of the present invention include the facilitation of video program content browsing of saved video (or server provided in some embodiments) for space limited devices. Applications of embodiments of the invention may include utilizations for devices that cannot afford to playback an entire video sequence due to power constraints (e.g., such as mobile devices). The browsing mechanism of exemplary embodiments enables a user to make a summary review of video program content from browsing in an amount of time that is significantly less than is required to view the entire video program content. Embodiments of the present invention afford users the capacity to easily locate parts of video program content that may be of interest to them. Moreover, a user may optimally utilize the limited display space of some devices (e.g., mobile device) by taking advantage of the plurality of presentation options available.

Exemplary Operations in Accordance with
Embodiments of the Present Invention

Figure 9:
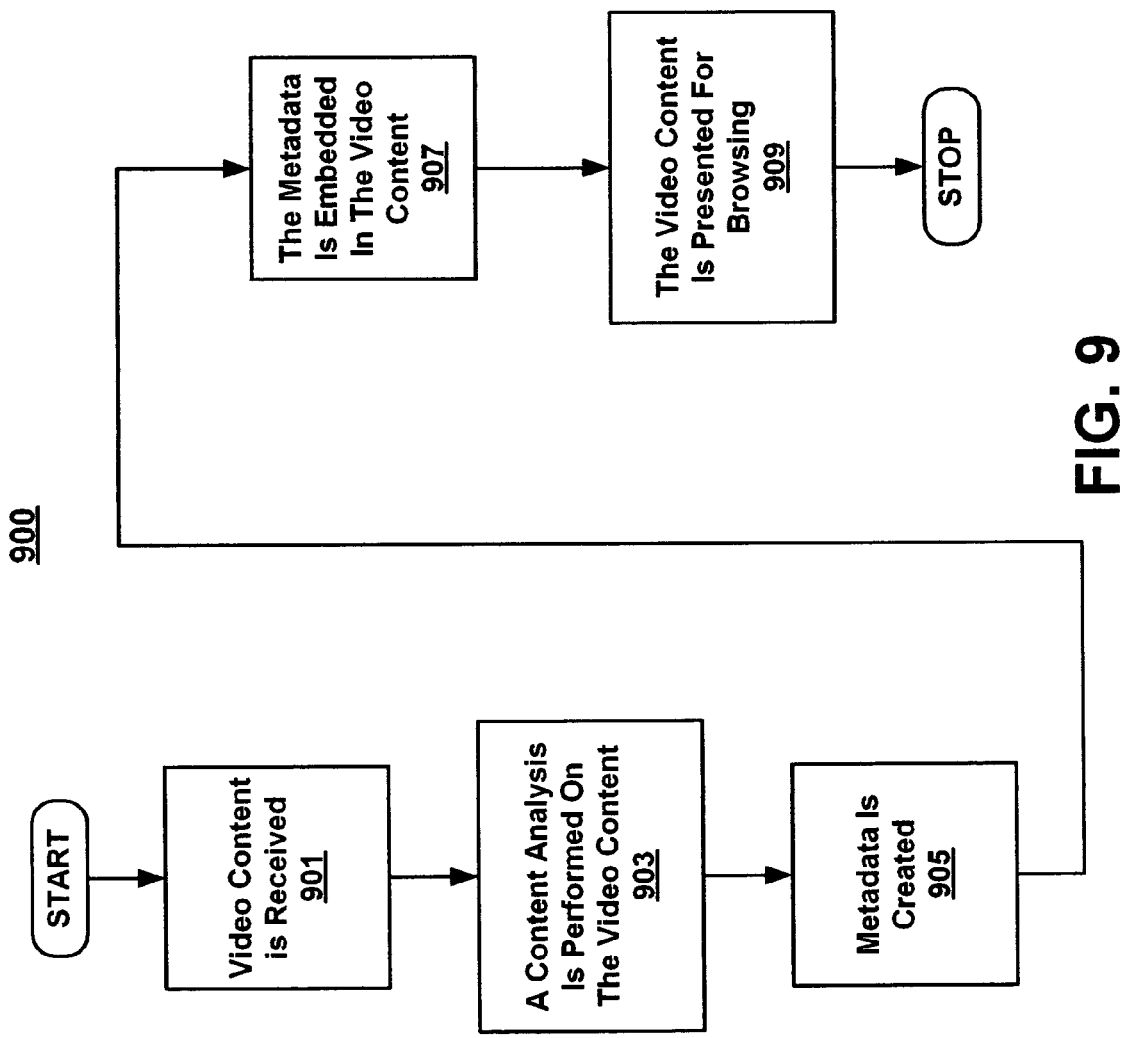
FIG. 9 is a flowchart of a process for browsing video content according to one embodiment of the present invention.

FIGS. 9 and 10 show flowcharts of the steps performed in accordance with embodiments of the present invention. The flowcharts include processes of the present invention which, in one embodiment, are carried out by processors and electrical components under the control of computer readable and computer executable instructions. The computer readable and computer executable instructions reside, for example, in data storage features such as computer usable volatile memory and/or computer usable non-volatile. However, the computer readable and computer executable instructions may reside in any type of computer readable medium. Although specific steps are disclosed in the flowcharts such steps are exemplary. That is, the present invention is well suited to performing various other steps or variations of the steps recited in FIGS. 9 and 10. Within the present embodiment, it should be appreciated that the steps of the flowcharts may be performed by software, by hardware or by any combination of software and hardware.

FIG. 9 is a flowchart 900 of a process for browsing video content according to one embodiment of the present invention. At step 901, digital video content is received. According to one embodiment the video content is received from a local video source (e.g., local storage). According to another embodiment, the video content is received from an external video source (e.g., such as from a server that embeds the video content with metadata before transmission). At step 903, a content analysis is performed on received video content. As described herein the content analysis is performed on the video content so that metadata that facilitates key-frame extraction can be created.

At step 905, metadata is created. According to one embodiment, key-frame based browsing is enabled by XML based meta data generated for video frames. According to one embodiment, a metadata generator first performs a key-frame extraction using content based analysis methods. The extracted key-frames along with the offset parameters of the shots represented by the extracted key-frames are organized into an XML data structure.

At step 907, the created metadata is embedded (e.g., such as by embedding the information in the user data field of a MPEG stream). Alternatively, the XML metadata may be embedded alone if the key-frames are selected as the intra-frames in a video sequence. Subsequently, the key-frames may be extracted from the video program content using the offset information provided in the metadata when a browsing operation is executed. It should be appreciated that this approach may reduce the storage overhead of the video program content. At step 909, the video is presented for browsing according to a selection made by the system user.

FIG. 10 is a flowchart 1000 of a process of creating and embedding metadata in a video content stream according to one embodiment of the present invention. At step 1001, key-frame extraction is performed on video content that that is to be browsed. At step 1003, extracted key-frames and offset parameters of the shots represented by the key-frames are organized into an XML data structure to generate metadata.

At step 1005, the generated metadata is embedded in a user data channel (e.g., channel of video signal employed to carry user data) of a signal from which the video content is derived. The metadata is subsequently used to facilitate the organization of the video content on a system display for browsing using one of a plurality of browsing modes that involves the use of key-frames and/or a video playback window.

As noted above with reference to exemplary embodiments thereof, the present invention provides a method for browsing video content. The method involves accessing video content and performing content analysis on the accessed video content. Metadata is generated from the content analysis that is performed on the accessed video content. The video content is subsequently presented on a system display for browsing based on the generated metadata.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for browsing video content comprising:
accessing video content;
generating metadata from a content analysis that is performed on said video content, wherein said metadata is generated by a metadata generator that performs key-frame extraction using a method selected from the group consisting of automatic content based analysis and manual extraction, and places said key-frames and offset parameters of shots represented by said key-frames into an extensible markup language (XML) data structure;
presenting selectable portions of said video content within a display based on the generated metadata; and
resizing at least one of said selectable portions within said display responsive to a user selection.

2. The method of claim 1, wherein said video content is presented on a system display for browsing using one of a plurality of browsing modes.

3. The method of claim 2, wherein said browsing is controlled using a stylus to initiate functions selected from the group consisting of scroll key-frames, speed up video playback, and slowdown video playback to demarcate a portion of said video content for display or magnification.

4. The method of claim 2, wherein said browsing modes are selected from the group consisting of key-frames only, video only and video and key-frames.

5. The method of claim 4, wherein said key-frames only mode further comprises spatial zoom in and zoom out sub-modes.

6. The method of claim 4, wherein said video only mode comprises cropped portion magnifier and partial view of full resolution video sub-modes.

7. The method of claim 4, wherein said video and key-frames mode comprises key-frame dominated and video-dominated sub-modes.

8. The method of claim 1, wherein said metadata includes fields that represent the filename of a key-frame, the start and end byte location of the video shot represented by said key frame, and the key-frame level.

9. The method of claim 8, wherein each key-frame represents a video content portion of a video sequence.

10. The method of claim 8, wherein overlaid text is associated with each said key-frame.

11. The method of claim 1, wherein said video content is supplied from internal storage or from an external server that supplies corresponding metadata.

12. The method of claim 1, wherein a presentation orientation involving said key-frames and a playback window is automatically determined.

13. The method of claim 1, wherein said metadata is embedded with said video content.

14. The method of claim 1, wherein said video content and said metadata are stored separately, wherein said metadata is mapped to said video content.

15. A method for processing video content comprising:
performing key-frame extraction on said video content;
organizing extracted key-frames and offset parameters of the shots represented by said key-frames into an extensible markup language (XML) data structure to generate metadata;
using said metadata to facilitate the organization of said video content on a system display;
presenting selectable portions of said video content within said system display based on said metadata; and
resizing at least one of said selectable portions within said display responsive to a user selection.

16. The method of claim 15, wherein said video content is presented on a system display using one of a plurality of browsing modes.

17. The method of claim 16, wherein said browsing is controlled using a stylus to scroll key-frames, speed up video playback, slowdown video playback and demarcating a portion of said video content for display or magnification.

18. The method of claim 16, wherein said browsing modes include key-frames only, video only and video and key-frames.

19. The method of claim 15, wherein said metadata is generated by a metadata generator that performs key frame extraction using an automatic content based analysis method or by using manual extraction.

20. The method of claim 15, further comprising placing said key-frames and offset parameters of shots represented by said key frames into an XML data structure.

21. The method of claim 15, wherein said metadata includes fields that represent the filename of a key-frame, the start and end byte location of the video shot represented said key-frame, and the key-frame level.

22. The method of claim 15, wherein each key frame represents a video content portion of a video sequence.

23. The method of claim 15, wherein overlaid text is associated with each key-frame.

24. A computer-usable medium having computer-readable program code embodied therein for causing a computer system to perform a method for browsing video content, said comprising:

accessing video content;

generating metadata from a content analysis that is performed on said video content, wherein said metadata is generated by a metadata generator that performs key-frame extraction using a method selected from the group consisting of automatic content based analysis and manual extraction, and places said key-frames and offset parameters of shots represented by said key-frames into an extensible markup language (XML) data structure;

presenting selectable portions of said video content within a display based on the generated metadata; and resizing at least one of said selectable portions within said display responsive to a user selection.

25. The computer-usable medium of claim 24, wherein said video content is presented on a system display for browsing using one of a plurality of browsing modes.

26. The computer-usable medium of claim 25, wherein said browsing modes are selected from the group consisting of key-frames only, video only and video and key-frames.

27. The computer-usable medium of claim 24, wherein said metadata is generated by a metadata generator that performs key-frame extraction using a method selected from the group consisting of automatic content based analysis and manual extraction.

28. The computer-usable medium of claim 24, wherein said metadata includes fields that represent the filename of a key-frame, the start and end byte location of the video shot represented by said key frame, and the key-frame level.

29. The computer-usable medium of claim 24, wherein said metadata is embedded with said video content.

* * * * *